United States Patent
Gao et al.

(10) Patent No.: US 9,728,957 B2
(45) Date of Patent: Aug. 8, 2017

(54) ONE QUARTER WAVELENGTH TRANSMISSION LINE BASED ELECTROSTATIC DISCHARGE (ESD) PROTECTION FOR INTEGRATED CIRCUITS

(71) Applicant: GLOBALFOUNDRIES Singapore Pte. Ltd., Singapore (SG)

(72) Inventors: Wei Gao, Singapore (SG); Wee Hua Tang, Singapore (SG); Chien-Hsin Lee, Malta, NY (US)

(73) Assignee: GLOBALFOUNDRIES SINGAPORE PTE. LTD., Singapore (SG)

( * ) Notice: Subject to any disclaimer, the term of this patent is extended or adjusted under 35 U.S.C. 154(b) by 123 days.

(21) Appl. No.: 14/703,845

(22) Filed: May 4, 2015

(65) Prior Publication Data
US 2016/0329880 A1   Nov. 10, 2016

(51) Int. Cl.
| | |
|---|---|
| H02H 9/02 | (2006.01) |
| H02H 9/04 | (2006.01) |
| H01P 1/201 | (2006.01) |
| H01P 1/203 | (2006.01) |
| H02H 3/22 | (2006.01) |

(52) U.S. Cl.
CPC ........... *H02H 9/041* (2013.01); *H01P 1/2013* (2013.01); *H01P 1/2039* (2013.01)

(58) Field of Classification Search
CPC .............................. H01L 27/0248; H01P 1/15
USPC ............ 333/12, 101, 104, 204, 205; 361/56
See application file for complete search history.

(56) References Cited

U.S. PATENT DOCUMENTS

| | | | | |
|---|---|---|---|---|
| 7,005,939 B2* | 2/2006 | Zerbe | .................. | H01L 27/0251 |
| | | | | 333/100 |
| 7,321,276 B2* | 1/2008 | Nichols | ................... | H01P 5/185 |
| | | | | 333/109 |
| 8,354,893 B2* | 1/2013 | Hauer | .................... | H03H 7/185 |
| | | | | 333/33 |
| 8,482,889 B2* | 7/2013 | Huang | .................. | H02H 9/046 |
| | | | | 361/111 |
| 9,093,977 B2* | 7/2015 | Jin | .......................... | H03H 7/40 |
| 9,118,176 B2* | 8/2015 | Kim | ....................... | H02H 9/044 |
| 9,337,157 B2* | 5/2016 | Ma | .......................... | H01L 23/60 |
| 9,397,087 B1* | 7/2016 | Kull | .................... | H01L 23/5227 |

(Continued)

FOREIGN PATENT DOCUMENTS

JP      2010165730 A   *   7/2010

*Primary Examiner* — Dean Takaoka
(74) *Attorney, Agent, or Firm* — Horizon IP PTE Ltd.

(57) ABSTRACT

Device and a method of forming an integrated circuit (IC) that offers protection against ESD in RE applications is disclosed. The device includes a transmission line (TL) coupled to a signal pad. The TL is a short circuited stub that is configured as an ESD protection device and as a band pass filter in dependence of a center frequency of the band pass filter. The TL is configured to pass through a signal in response to a frequency of the signal being within an allowable range of frequencies of the band pass filter. The TL functioning as an ESD protection device is configured to shunt the signal in response to the frequency being outside the allowable range. The IC may include an array of control switches that are operable to change an electrical length L of the TL. The center frequency is tunable by controlling the electrical length L.

20 Claims, 11 Drawing Sheets

(56) References Cited

U.S. PATENT DOCUMENTS

| 9,426,871 B2* | 8/2016 | Hung | H05K 1/0227 |
| 2008/0112101 A1* | 5/2008 | McElwee | H04L 25/0266 |
| | | | 361/56 |

* cited by examiner

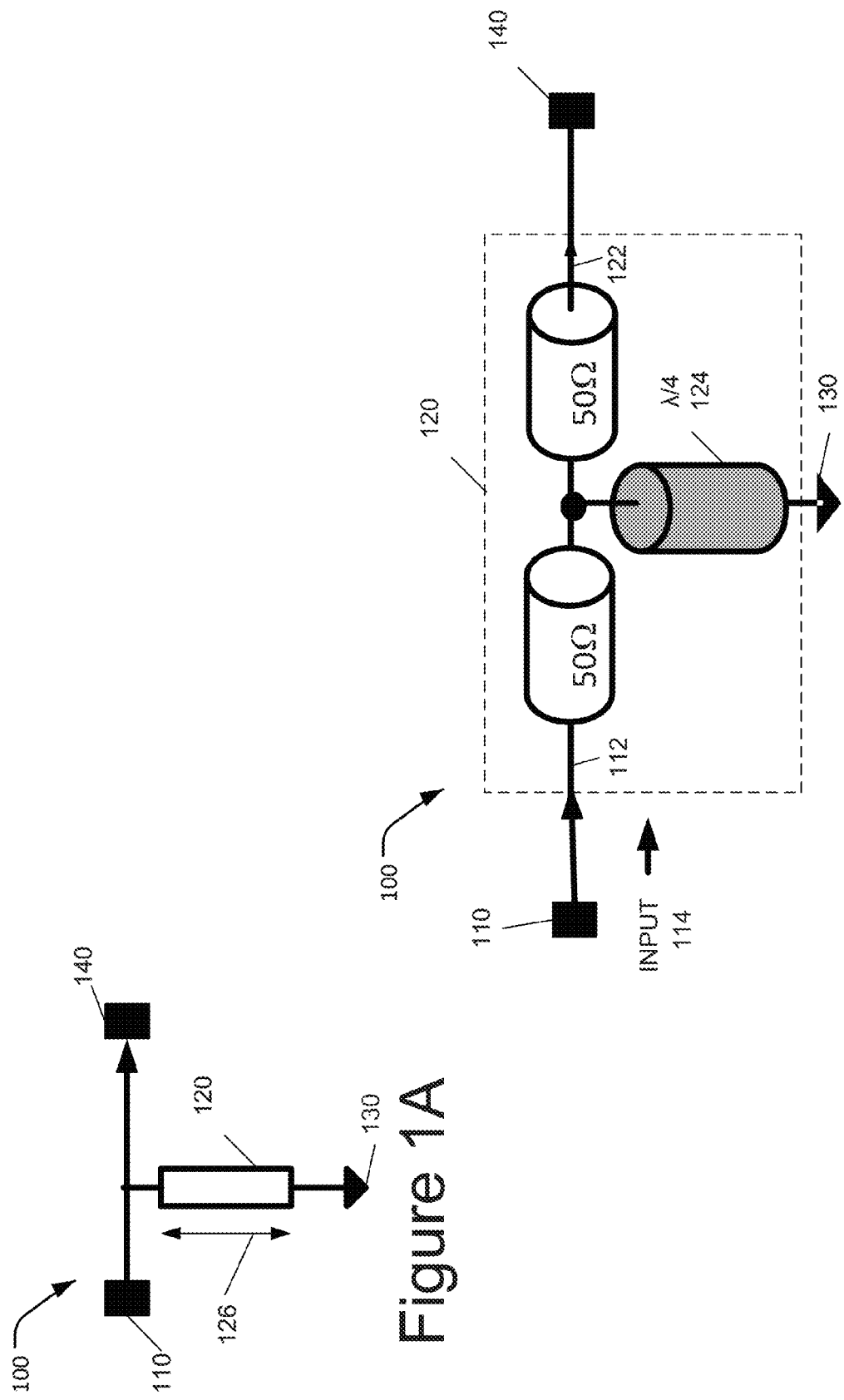

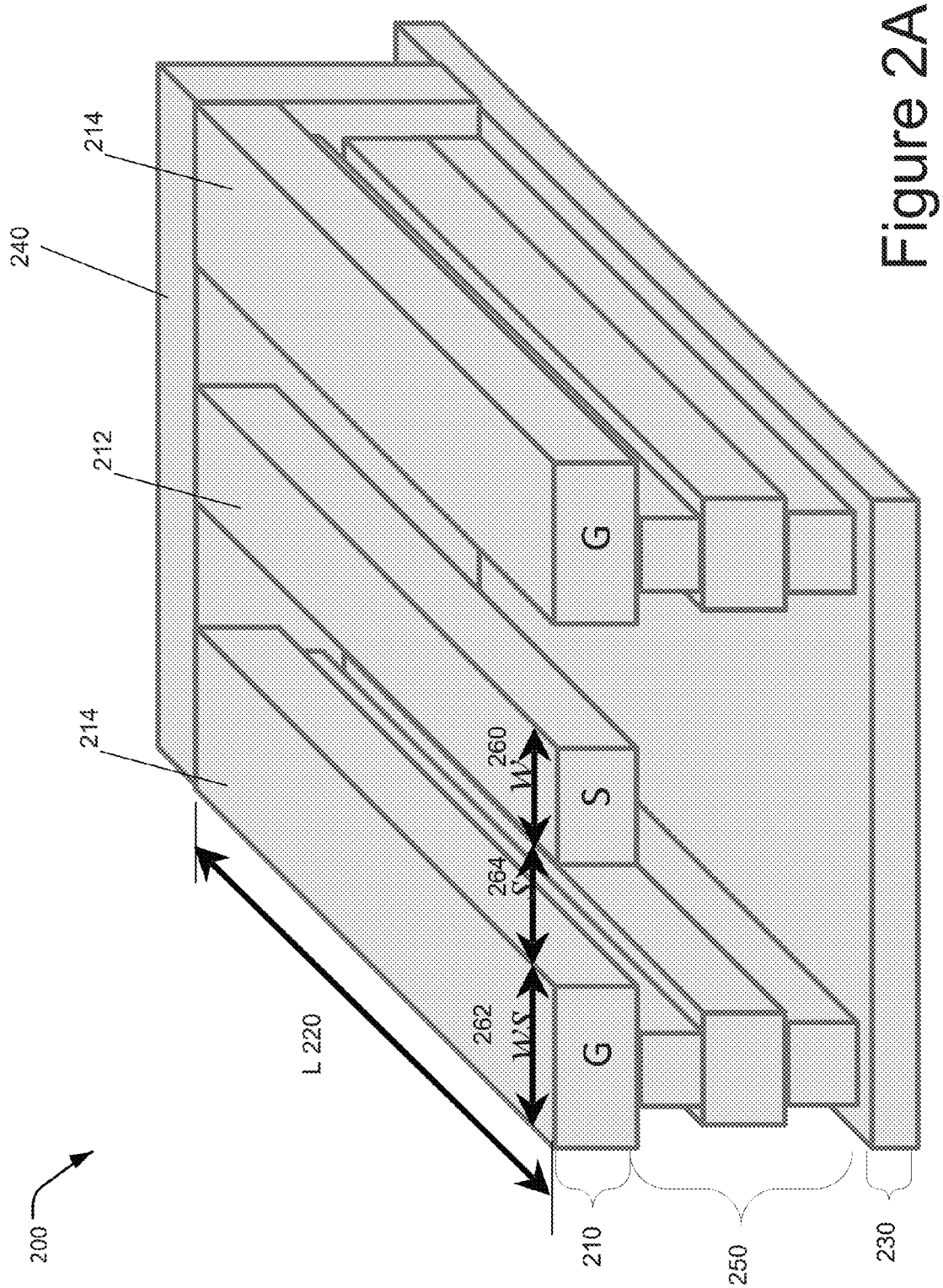

ONE QUARTER WAVELENGTH TRANSMISSION LINE BASED ELECTROSTATIC DISCHARGE (ESD) PROTECTION FOR INTEGRATED CIRCUITS

BACKGROUND

In the electronics industry, occurrence of an electrostatic discharge (ESD) can severely and irreparably damage unprotected electronic devices. Many integrated circuit chips have built-in ESD protection circuits to provide some measure of protection against the undesirable flow of damage-causing currents.

In high radio frequency (RF) applications (e.g., RF frequency greater than 1 GHz), parasitic capacitance (and inductance) from ESD protection circuits may have a negative effect on the electronic device performance and may cause a significant decrease in the RF bandwidth. The negative effect of parasitic capacitance on integrity of data signals and device performance may be even more pronounced as the RF frequency increases above 10 GHz.

From the foregoing discussion, it is desirable to provide tools and techniques to improve device performance as well as provide ESD protection to electronic devices over a wide range of frequencies including high frequency RF applications.

SUMMARY

Embodiments generally relate to device and method of tuning an integrated circuit chip that has built-in ESD protection circuits. In one embodiment, a device and a method of tuning an integrated circuit (IC) that offers protection against ESD in RF applications is disclosed. The device includes a transmission line (TL) coupled to a signal pad. The TL is a short circuited stub that is configured as an ESD protection device and as a band pass filter in dependence of a center frequency of the band pass filter. The TL is configured to pass through a signal in response to a frequency of the signal being within an allowable range of frequencies of the band pass filter. In one configuration, an electrical length L of the TL is configured to be exactly equal to one quarter the wavelength corresponding to an operating frequency of the IC or the TL. The TL functioning as an ESD protection device is configured to shunt the signal in response to the frequency being outside the allowable range. The IC includes an array of control switches that are operable to change an electrical length L of the TL. The center frequency is tunable by controlling the electrical length L.

In yet another embodiment, a method to tune an ESD protection device is disclosed. A TL is configured as a short circuited stub, the TL being configured as an ESD protection device and as a band pass filter in dependence of a center frequency of the band pass filter. The center frequency may be configured as a tunable parameter by changing an electrical length L of the TL, where the electrical length L is changed by controlling an array of control switches.

These and other a advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure. In the following description, various embodiments of the present disclosure are described with reference to the following drawings, in which:

FIG. 1A shows a simplified block diagram of an embodiment of a portion of an ESD protection system using a transmission line (TL).

FIG. 1B shows a simplified block diagram of an embodiment of a portion of an ESD protection system using a short circuited stub.

FIG. 2A is an isometric view of an embodiment of a portion of an ESD protection system implemented as a coplanar waveguide.

DETAILED DESCRIPTION

Figure 1C:
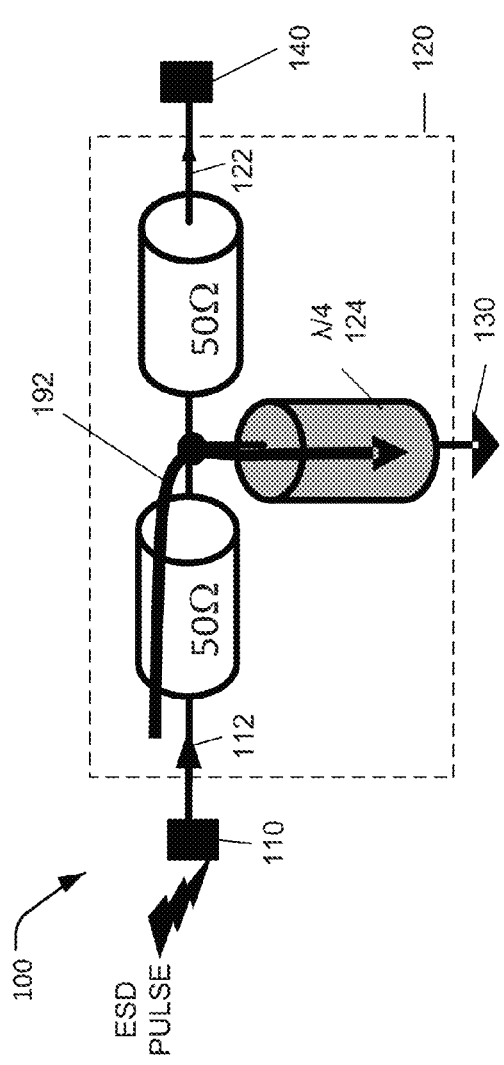
FIG. 1C shows an exemplary path of an ESD current flowing through the ESD protection system.

Novel features believed characteristic of the present disclosure are set forth in the appended claims. The disclosure itself, however, as well as a preferred mode of use, various advantages thereof, will best be understood by reference to the following detailed description of an illustrative embodiment when read in conjunction with the accompanying drawings. The functionality of various circuits, devices or components described herein may be implemented as hardware (including discrete components, integrated circuits and systems-on-a-chip 'SoC'), firmware (including application specific integrated circuits and programmable chips) and/or software or a combination thereof, depending on the application requirements.

Similarly, the functionality of various mechanical elements, members, and/or components for forming modules, sub-assemblies and assemblies assembled in accordance with a structure for an apparatus may be implemented using various materials and coupling techniques, depending on the application requirements.

Descriptive and directional terms used in the written description such as top, bottom, left, right, upstream, downstream, and similar others, refer to the drawings themselves as laid out on the paper and not to physical limitations of the disclosure unless specifically noted. The accompanying drawings may not to be drawn to scale and some features of embodiments shown and described herein may be simplified or exaggerated for illustrating the principles, features, and advantages of the disclosure.

Embodiments generally relate to devices, such as semiconductor devices or ICs. Other types of devices may also be useful. The devices can be any type of IC, such as chips for wireless and radio frequency (RF) communications. The devices can be incorporated into, for example, consumer electronic products, such as computers, cell phones, wireless electronic devices like watches, cameras and printers, and several types of tablet computing devices. Incorporating the devices in other suitable applications may also be useful.

Static electricity may be generated during everyday activities such as walking on a carpet or drying clothes made from synthetic fiber in a dryer thereby causing objects to have different electric potentials. Electrostatic discharge (ESD) is often described as a sudden and momentary flow of electric current (or energy) between two objects at different electrical potentials. In the context of electronic devices, ESD events may be described as momentary and undesirable spikes in current flow that may cause damage to electronic devices. In an ESD event, static electricity in the form of large voltage spikes or pulses may be transferred to a signal pad or a pin contact of an integrated circuit (IC), which may cause a breakdown of insulating layers within the IC. This may result in formation of short circuits between one or more conducting paths leading to the failure of the IC. In some cases, the ESD event may cause overheating of metal or even evaporation of material within the IC.

ESD Association is a well-known American National Standards Institute (ANSI) recognized standard development organization that has published over 35 ESD standards including Human Body Model (HBM), Machine Model (MM), Charged Device Model (CDM) and others that cover ESD in the electronics environment. Described below are various embodiments that provide an improved ESD protection to electronic devices while concurrently improving their performance over a wide range of frequencies including wireless, high frequency RF applications.

Figure 1D:
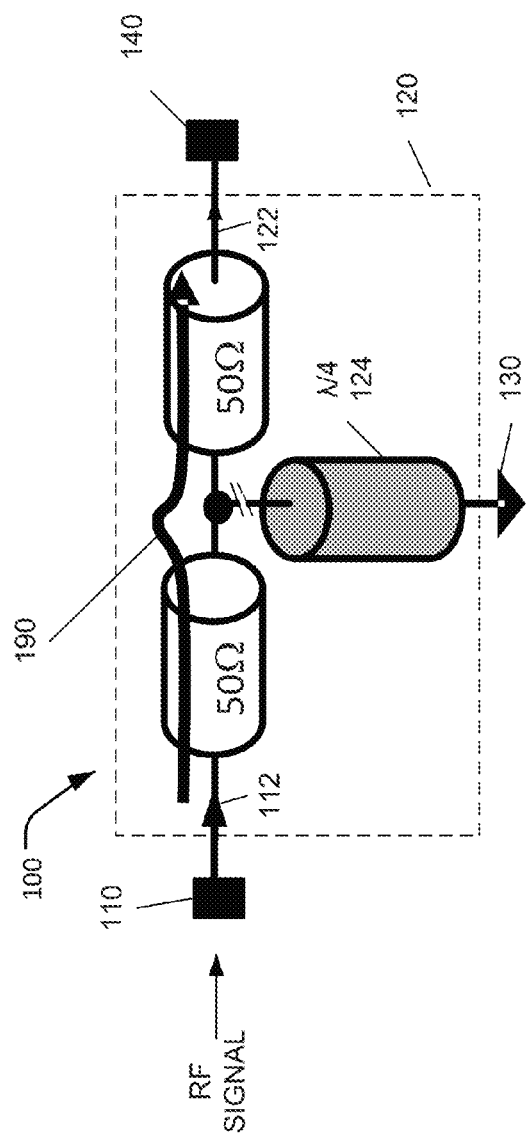
FIG. 1D shows an exemplary path of a RF signal flowing through the ESD protection system.
Figure 1E:
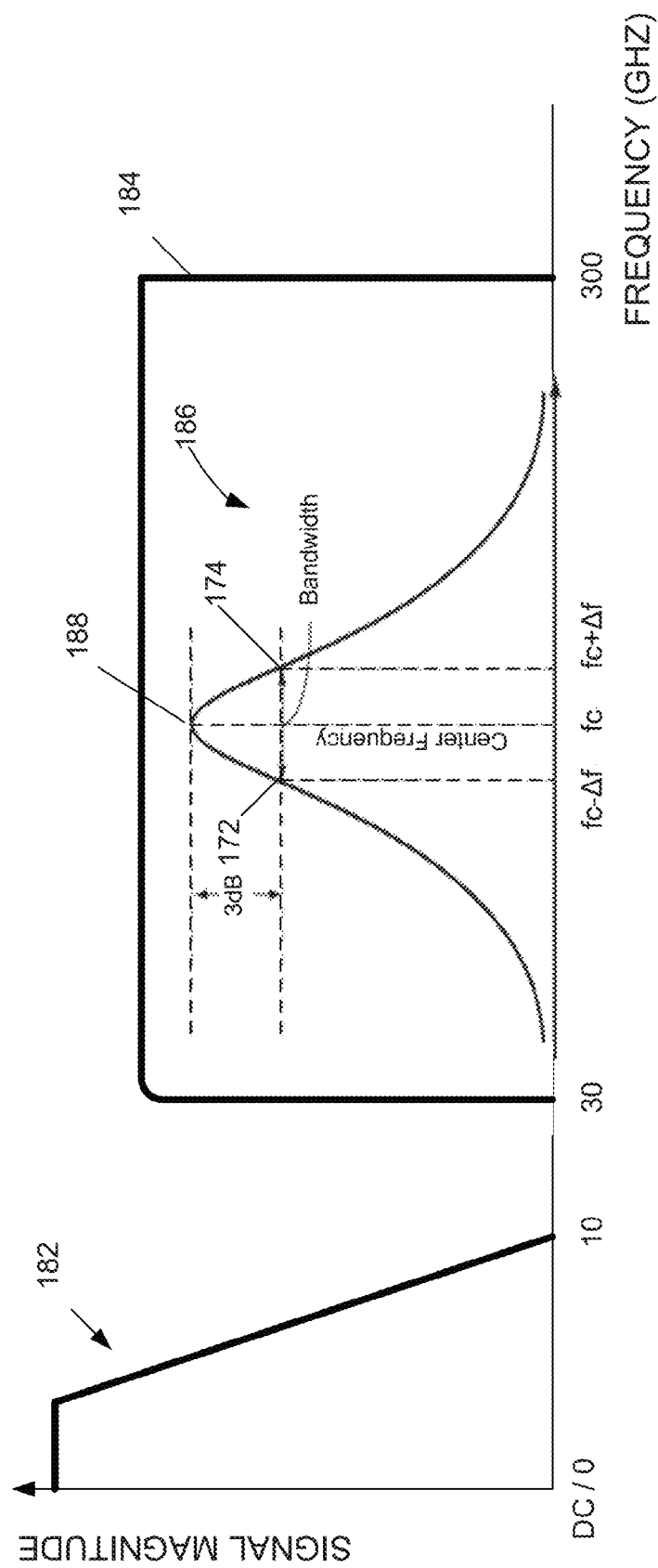
FIG. 1E shows a frequency spectrum graph of ESD and RF signals processed by the ESD protection system.

FIG. 1A shows a simplified block diagram of an embodiment of a portion of an ESD protection system 100 using a transmission line (TL). FIG. 1B shows a simplified block diagram of an ESD protection system 100 using a short circuited stub. FIG. 1C shows an exemplary path of an ESD current flowing through the ESD protection system 100. FIG. 1D shows an exemplary path of a RF signal flowing through the ESD protection system 100. FIG. 1E shows a frequency spectrum graph of ESD and RF signals processed by the ESD protection system 100.

Referring to FIGS. 1A, 1B, 1C, 1D, and 1E, the portion of the ESD protection system 100 includes a signal pad 110 coupled to receive a signal 112, a transmission line (TL) 120 coupled to the signal pad 110 at one end and to a ground 130 at the opposite end, the ground being used as a voltage reference. The TL 120 is configured to have an electrical length L 126. The TL 120 may be configured to provide an output signal 122 via an output pad 140 to a load (not shown). The load (not shown) may be coupled between the output pad 140 and the ground 130. In an embodiment, the ESD protection system may be configured to process ESD signals and RF signals, the ESD signals having a lower frequency compared to the RF signals. Additional details about a frequency spectrum of the ESD and high frequency signals in RF and millimeter wave (mmW) band is described with reference to FIG. 1E.

Referring back to FIGS. 1A, 1B, 1C, 1D, and 1E, a short circuited stub (may also be referred to as a resonant stub or simply a stub) is the TL 120 that is coupled to the signal at one end only and a free end 124 of the stub is short circuited. The free end 124 of the short circuited stub may be connected to the ground. In the depicted embodiments, the TL 120 is configured as a short circuited stub having the electrical length L 126, which may be varied. Tools and techniques for dynamically changing the electrical length L 126 of the TL are described with reference to FIG. 6.

Referring back to FIGS. 1A, 1B, 1C, 1D and 1E, assuming a relative dielectric constant of 1 for the TL, a wavelength $\lambda$ of a signal may be computed by dividing the speed of light divided by frequency f. A TL that is terminated in a load impedance ZL, that is different from the characteristic impedance Z0, will result in a signal being reflected from the load back to the source. In the depicted embodiment, TL 120 is shown to have a characteristic impedance of 50 ohms. Other values of characteristic impedances such as 75 ohms may also be useful.

Stubs may be tuned, e.g., by adjusting the electrical length L. In an embodiment, the electrical length L 126 is tuned to be exactly equal to one quarter of a wavelength of the signal, the wavelength corresponding to the IC's operating frequency. In an embodiment, the IC's operating frequency may be configured to be the same as a center frequency fc. Any change in the electrical length L causes a corresponding change in the center frequency fc and vice versa.

The impedance $Z_{TL}$ 114 is a function of its own characteristic impedance and a tangent (TAN) value of the phase constant of the TL. The phase constant may be expressed as $(2\pi/\lambda)*L$. Thus, one property of the TL 120 is that it inverts the impedance every quarter wavelength. So a quarter-wave stub which is short circuited at one end appears like an open circuit at the other end of the TL. In an embodiment, the input impedance $Z_{TL}$ 114 of the TL 120 may be configured to be equal to 50 ohms.

Referring FIG. 1E, a frequency spectrum of ESD signals 182 (in the form of pulses or spikes) resulting from an ESD event typically varies from direct current (DC) to about 1 GHz. However, in some applications, the frequency of the ESD signals may be as high as 10 GHz. As described earlier, the frequency spectrum of high frequency RF and millimeter wave (mmW) application signals 184 typically varies from about 30 GHz to about 300 GHz (referred to as extremely high frequency (EHF) band). In RF applications, the TL 120 may be configured as a bell-shaped band pass filter 186 having a center frequency fc 188 that allows signals with frequencies in the EHF band to pass through with little or no loss. In some applications, the bandwidth of the band pass filter may be narrower than the EHF band, e.g., between fc−Δf as the lower cutoff frequency 172 and fc+Δf as the higher cutoff frequency 174 (where fc−Δf, fc and fc+Δf are well within the EHF band). For example, in one RF application, the TL may be tuned to have an operating frequency (which may be configured to be equal to a center frequency fc) of about 60 GHz (which corresponds to a wavelength of 5 millimeters in free space and about 2.5 millimeters in Silicon having a dielectric constant of 3.9) and the bandwidth 2Δf is typically 7~10 GHz, which is suitable for most ultra-wide band (UWB) frequency applications. Other values for fc, fc−Δf and fc+Δf may also be useful.

Referring back to FIGS. 1A, 1B, 1C, 1D and 1E, when the TL is configured as a quarter wave, the short circuited stub provides an impedance in dependence of the frequency of the signal. If the frequency of the signal is outside the allowable range of frequencies for the ESD protection system, then the Zin impedance for the TL is very low due to a shunt path for lower frequency signals. If the frequency of the signal is within the allowable range of frequencies, then the Zin impedance is very low for the higher frequency signals. Thus, the quarter wave, short circuited stub provides zero or low impedance path 190 to a RF signal having an allowable range of frequencies relative to the center frequency fc and at the same time provides a shunt or low impedance path 192 to ESD signals having lower frequencies that are outside the allowable range compared to the center frequency.

The frequency spread between an ESD signal and a RF signal may be used by a filtering device (e.g., by using the TL 120) to filter and direct ESD signals and RF signals along two separate paths 190 and 192 respectively in dependence of the center frequency fc of the TL. In the depicted embodiment, the TL 120 is configured to provide at least two functions, providing RF filtering via path 190 and providing ESD protection for a load via path 192.

In an embodiment, the TL may be fabricated on an integrated circuit as a stripline, microstrip, coplanar stripline, and/or a coplanar waveguide. Additional details of the TL 120 implemented as a coplanar waveguide is described with reference to FIG. 2A.

As described herein, 'ground' node refers to any node that serves as "AC ground" but can have any "DC" voltage reference, which may not be at zero volts. It is understood that the signal pad and the output pad may also be implemented as conductive bumps, contacts, pins, bonding areas, and others. The ESD protection device may be used to protect the IC from damage due to ESD pulses being coupled to the input and output pads of the chip. Additional details of a circuit that provides ESD protection for an integrated circuit from ESD pulses received at input and output pads is described with reference to FIG. 5.

FIG. 2A is an isometric view of an embodiment of a portion of an ESD protection system implemented as a coplanar waveguide 200. In an embodiment, the TL 120 is implemented as coplanar guide that is configured as a short circuited stub. The coplanar waveguide is tuned to resonate at a center frequency fc. Coplanar waveguides as described herein may be implemented as rectangular metal tubes that propagate electromagnetic wave between two points. Electromagnetic fields within the coplanar waveguide may be typically shielded to minimize losses.

In the depicted embodiment, coplanar waveguide is an integrated circuit that may be fabricated by forming a top metal layer 210 having a center signal trace 212 equally separated from a pair of ground traces 214 by a configurable gap 264, the pair of ground traces being disposed on either side of the center signal trace. The center signal trace and the pair of ground traces are coplanar that may be configured to have an electrical length L 220, which is configured to be exactly equal to (¼)λ, where λ is a wavelength corresponding to an operating frequency of the IC. In an embodiment, the operating frequency of the IC may be configured to be equal to the center frequency fc. The coplanar waveguide 200 also includes a base metal layer 230 that acts as a shield for the electromagnetic waves. An end metal plate 240 of the waveguide is coupled to the center signal trace, the pair of ground traces and the base metal layer 230 to provide the short circuited stub. Disposed between the pair of ground traces and the base metal layer are layers 250 of dielectric and/or metal that form the side walls of the coplanar waveguide.

The impedance of the coplanar waveguide is determined by the dimensions of waveguide, e.g., a width 260 of the center signal trace, the width of the pair of ground traces 262 and by the separation or gap 264 between the traces. Most guides include a dielectric material, e.g., air, filling some or all of the space between the walls. The relative permittivity of the dielectric material may impact the actual velocity of the electromagnetic wave. Thus, changes in velocity m suit in a deviation in the actual value of the center frequency compared to a designed value of the center frequency.

Figure 2B:
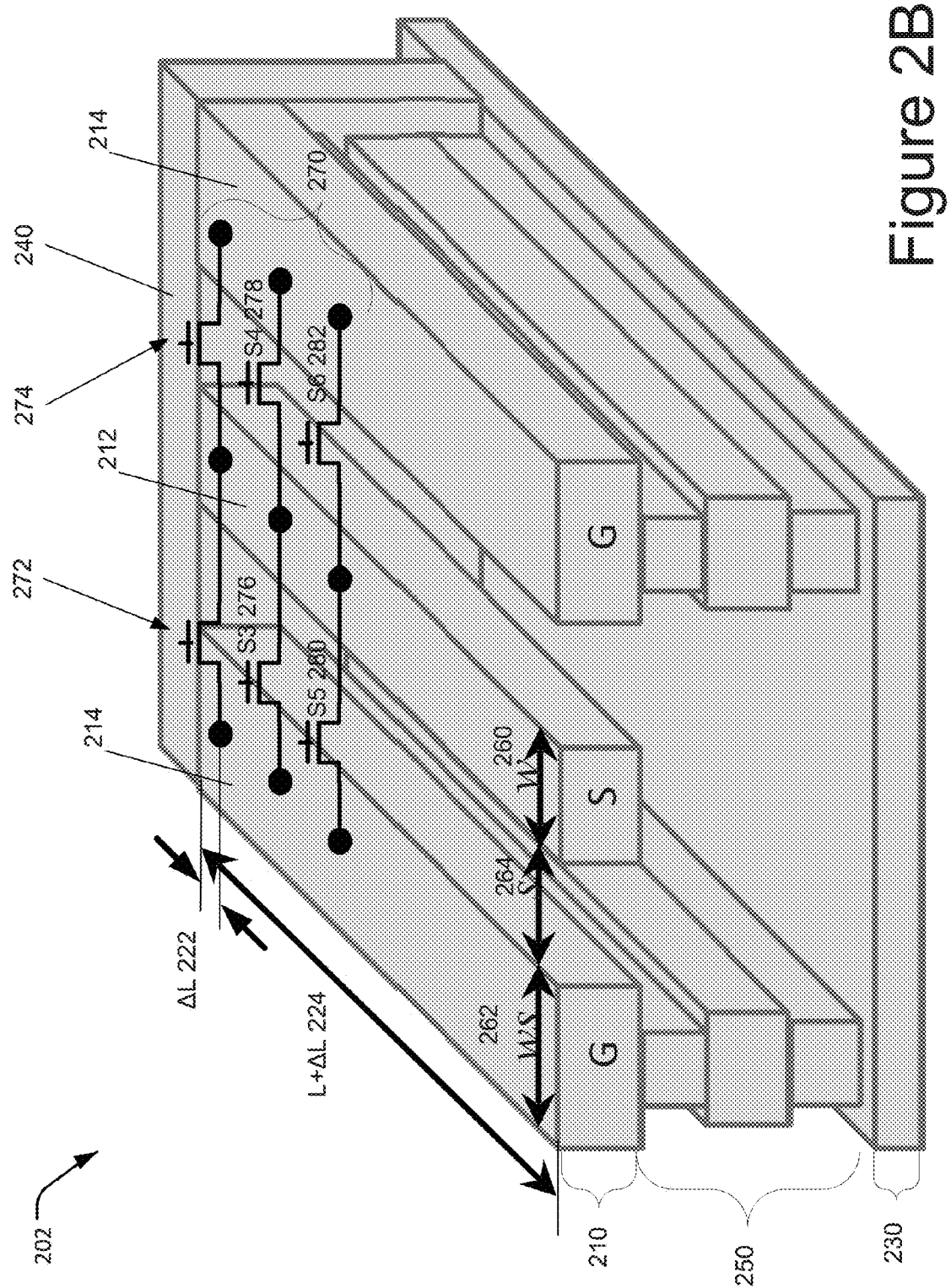
FIG. 2B is an isometric view of an embodiment of a portion of an ESD protection system implemented as a tunable coplanar waveguide.

FIG. 2B is an isometric view of an embodiment of a portion of an ESD protection system implemented as a tunable coplanar waveguide 202. In an embodiment, the TL 120 is implemented as coplanar waveguide that is configured as a short circuited stub. In the depicted embodiment, the coplanar waveguide is tunable, e.g., may be tuned to resonate at a center frequency fc by adjusting the electrical length L of the TL 120. Coplanar waveguides as described herein may be implemented as rectangular metal tubes that propagate electromagnetic wave between two points. Electromagnetic fields within the coplanar waveguide may be typically shielded to minimize losses.

In the depicted embodiment, the tunable coplanar waveguide 202 is an integrated circuit that may be fabricated by forming a top metal layer 210 having a center signal trace 212 equally separated from a pair of ground traces 214 by a configurable gap 264, the pair of ground traces being disposed on either side of the center signal trace. The center signal trace and the pair of ground traces are coplanar that may be configured to have an electrical length L+ΔL 224. The coplanar waveguide 200 also includes a base metal layer 230 that acts as a shield for the electromagnetic waves. An end metal plate 240 of the waveguide is coupled to the center signal trace, the pair of ground traces and the base metal layer 230 to provide the short circuited stub. Disposed between the pair of ground traces and the base metal layer are layers 250 of dielectric and/or metal that form the side walls of the coplanar waveguide.

The impedance of the tunable coplanar waveguide 202 is determined by the dimensions of waveguide, e.g., a width 260 of the center signal trace, the width of the pair of ground traces 262 and by the separation or gap 264 between the traces. Most waveguides include a dielectric material, e.g., air, filling some or all of the space between the walls. The relative permittivity of the dielectric material may impact the actual velocity of the electromagnetic wave. Thus, changes in velocity may result in a deviation in the actual value of the center frequency compared to a designed value of the center frequency. Changes in the center frequency (due to changes in the velocity) may be tuned or compensated for by adjusting an electrical length L of the coplanar waveguide.

In an embodiment, an array of control switches 270 are operable to dynamically vary the electrical length L of the short circuited path. The array of control switches, which are configured to include at least two control switches, may be implemented as transistors fabricated on a semiconductor substrate (not shown) of the IC. A pair of control switches coupled to their respective conductive traces may be used to form alternate short circuit paths for RF signals. The array of control switches may be disposed near the short circuited end of the coplanar waveguide. For example, if the array of control switches are open, the short circuit path is via the end metal plate and the electrical length of the coplanar waveguide is L+ΔL 224. By asserting switches S1 272 and S2 274, RF signals can now flow via a shorter short circuited path having a length L [(L+ΔL) 220−ΔL 222]. The length of the short circuited path may be dynamically changed to change the effective electrical length. For example, by asserting switches S3 276 and S4 278, the effective electrical length is changed to L−ΔL.

A change in the electrical length L, causes a corresponding change in the center frequency. Thus, the waveguide may be configured as a tuning device that may be tuned to an application dependent center frequency fc by adjusting its electrical length L. The change in center frequency fc may be configured to compensate for changes in the velocity of electromagnetic waves. It is contemplated that additional switches such as switches S5 280 and S6 282, may be asserted to change the electrical length L in order to match application requirements. In an embodiment, the array of control switches are configured to operate in the RF band.

Figure 3:
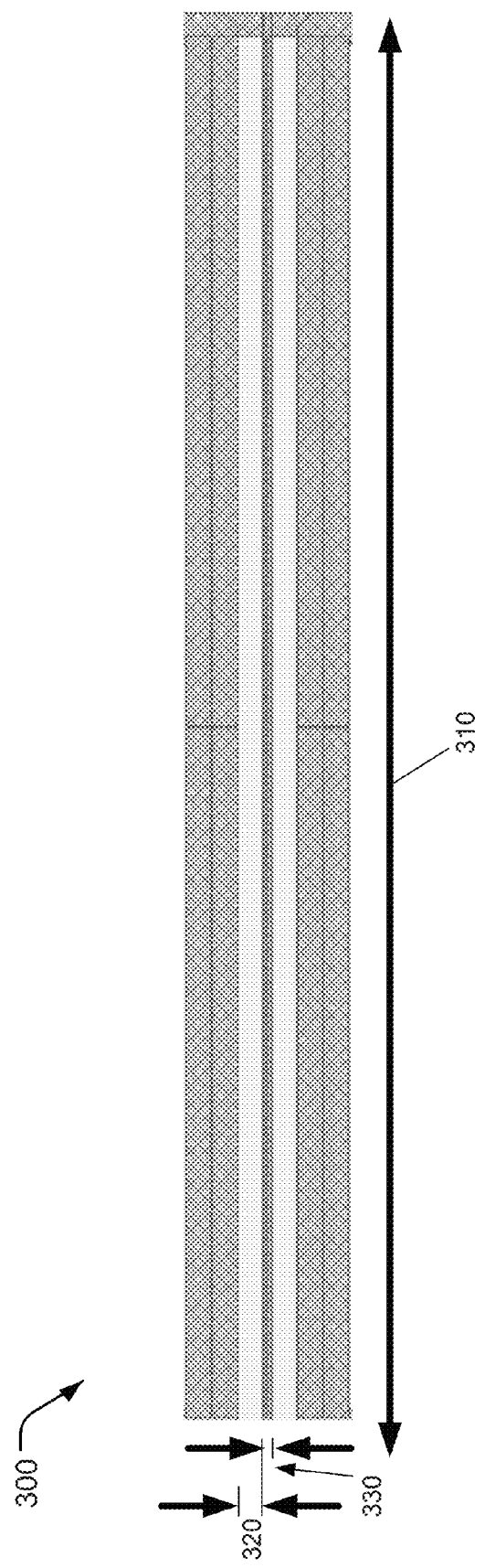
FIG. 3 is a top view of an embodiment of a portion of an ESD protection system implemented as a coplanar waveguide.

FIG. 3 is a top view of an embodiment of a portion of an ESD protect on device implemented as a coplanar waveguide 300. In the depicted embodiment, the TL 120 may be implemented as a coplanar waveguide that is configured to have a center frequency of 67 GHz in this example and, at the same time, is also configured to provide ESD protection from ESD signals having frequencies much less than 67 GHz. Physical dimensions of the coplanar waveguide 300 having center frequency of 67 GHz, for example, include an electrical length L 310 equal to 550 µm, a gap 320 or spacing between the center signal trace and the pair of ground traces equal to 12 µm and a width 330 of the center signal trace of 4 µm. Performance of the coplanar waveguide 300 measured in terms of impedance, frequency response, insertion loss, response to an ESD event, and other measurements is described with reference to FIGS. 4A, 4B, 4C and 4D in additional detail.

Figure 4A:
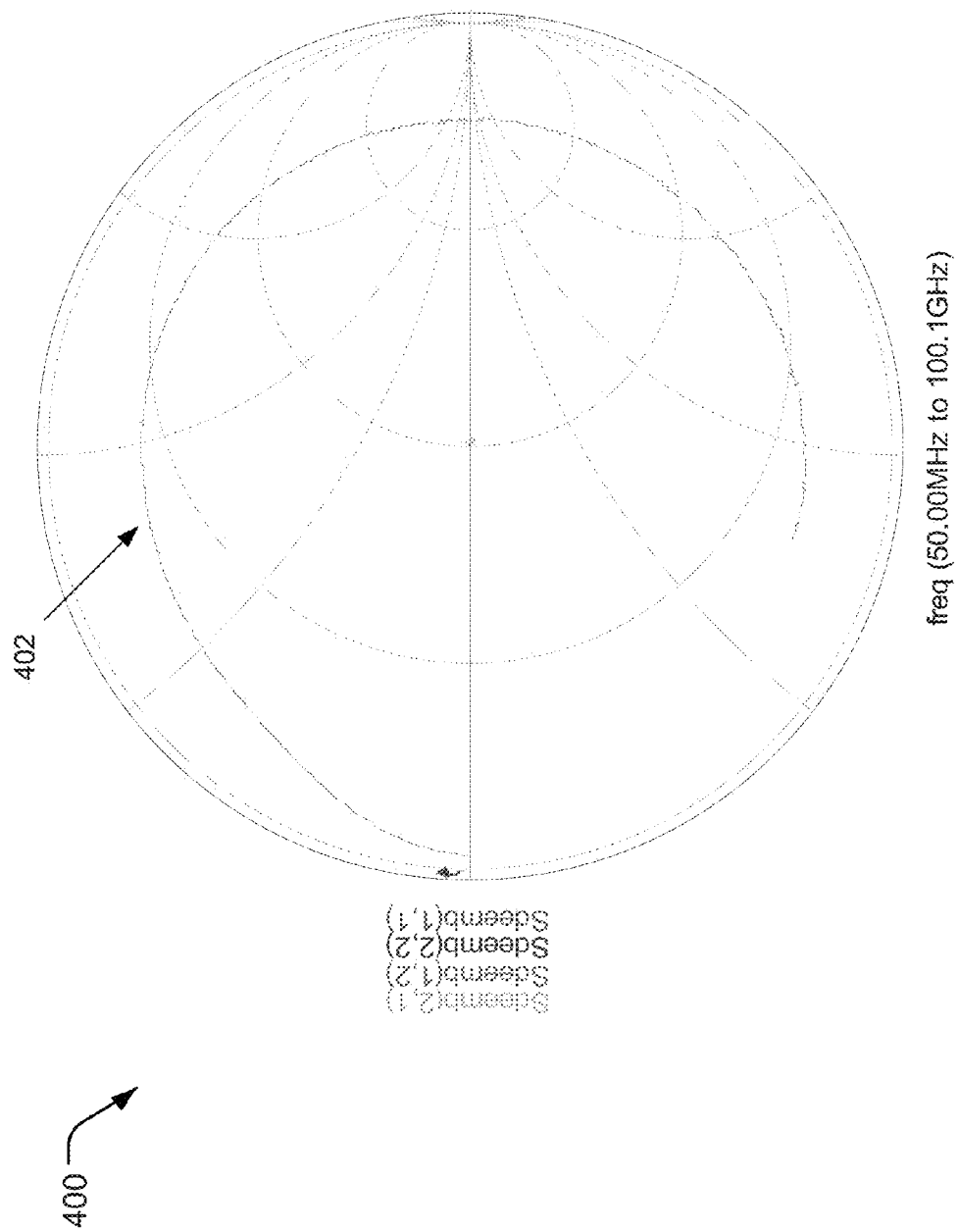
FIGS. 4A, 4B, 4C and 4D illustrate in graphical form various performance measures of a TL implemented as a coplanar waveguide.

FIGS. 4A, 4B, 4C and 4D illustrate in graphical form performance measures of the TL 120 implemented as a coplanar waveguide 300 described with reference to FIGS. 1A, 1B, 1C, 1D, 1E, 2A, 2B, and 3. Commercially available modeling/simulation software may be used to estimate performance measures such as impedance, insertion loss, and others. In one embodiment, the wavelength at 67 GHz traveling in Silicon material is approximately 2.2 mm compared to free space wavelength of 4.475 mm since dielectric material such as $SiO_2$ has a relative permittivity ($\in_r$) value of approximately 4. FIG. 4A is a Smith chart 400 illustrating an impedance 402 of the coplanar waveguide described with reference to FIGS. 2A and 3 measured over the frequency range from 500 MHz to 100.1 GHz. The long trace of 402 is $S_{11}$ starting from the left position of the Smith chart (showing SHORT characteristic at DC), until intercepting the X-axis at the right position of the Smith chart at 67 GHz (showing OPEN characteristic).

Figures 4B, 4C:
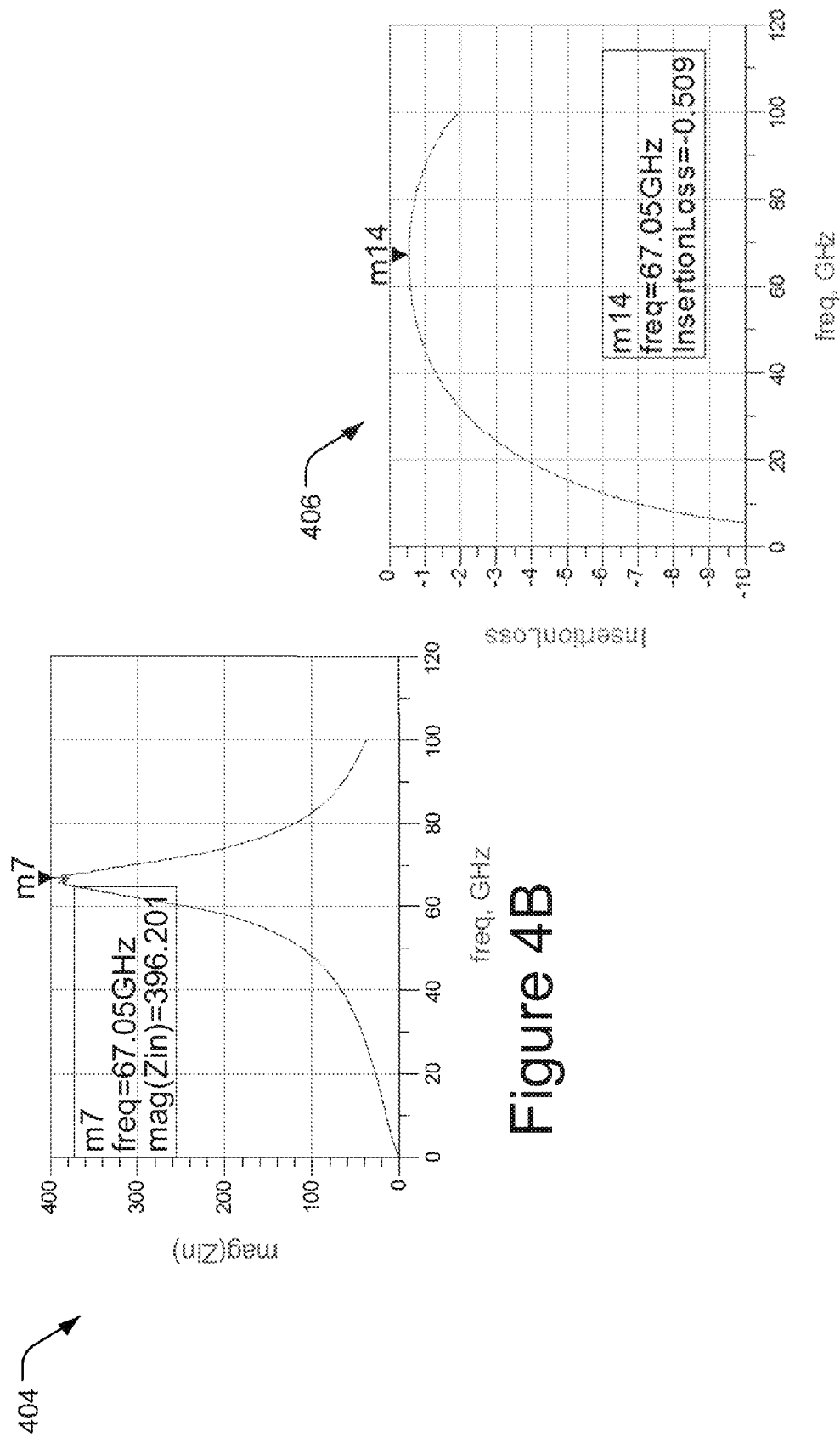

FIG. 4B is a graph 404 illustrating impedance (Y axis) as a function of frequency (X axis). At the center frequency fc of 67.05 GHz the peak impedance of the coplanar waveguide is approximately 396 ohms. FIG. 4C is a graph 406 illustrating insertion loss (Y axis) as a function of frequency (X axis) for a 50-Ohm system if inserted with such an ESD short stub as shunt (described with reference to FIG. 1D). At the center frequency of 67.05 GHz the peak shunted insertion loss is approximately −0.5 dB: $1/(1+0.5*Z0/Z_{TL})$.

Figure 4D:
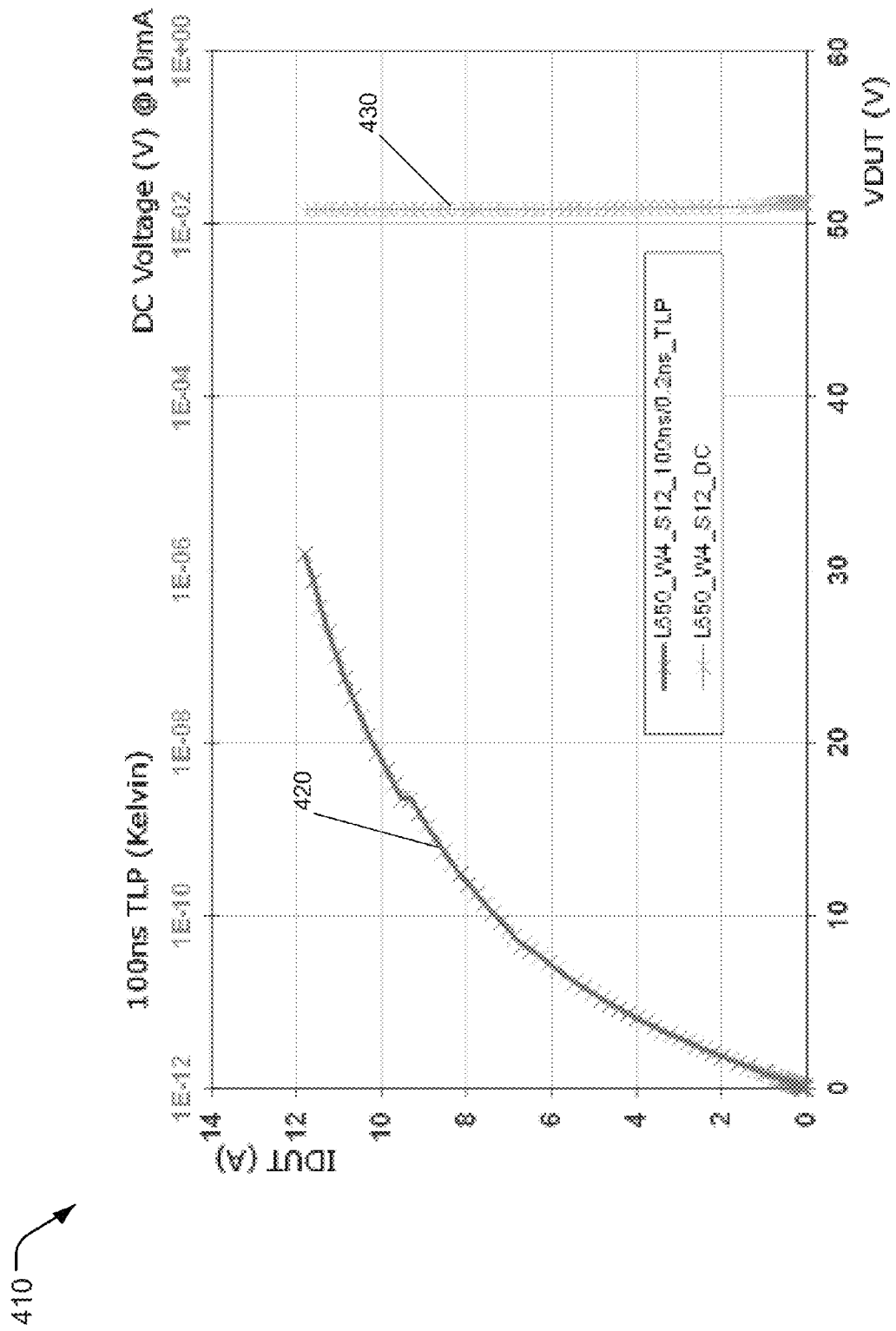

FIG. 4D is a transmission line pulse (TLP) graph 410 illustrating the ESD performance of the coplanar waveguide described with reference to FIGS. 1A, 1B, 1C, 1D, 1E, 2A, 2B and 3. TLP graph 420 illustrates current (Y axis) versus voltage (X axis) (I-V) performance data in which each data point is obtained from a pulse that reflects the characteristics of ESD waveforms: 0.2 nanosecond rise time and 100 ns pulse width. The 100 ns pulse length and current levels up to 14A is far greater than the pulse lengths and currents that may occur in real ESD events (e.g., the HBM 2 kV specification typically requires a TLP around 1.33 A), TLP graph 430 illustrates I-V performance data for a DC ESD signal.

Thus, various embodiments of TL described with reference to FIGS. 1A, 1B, 1C, 1D, 1E, 2A, 2B and 3 provide improved ESD protection to electronic devices while concurrently improving their performance over a wide range of frequencies including wireless, high frequency RF applications.

Figure 5:
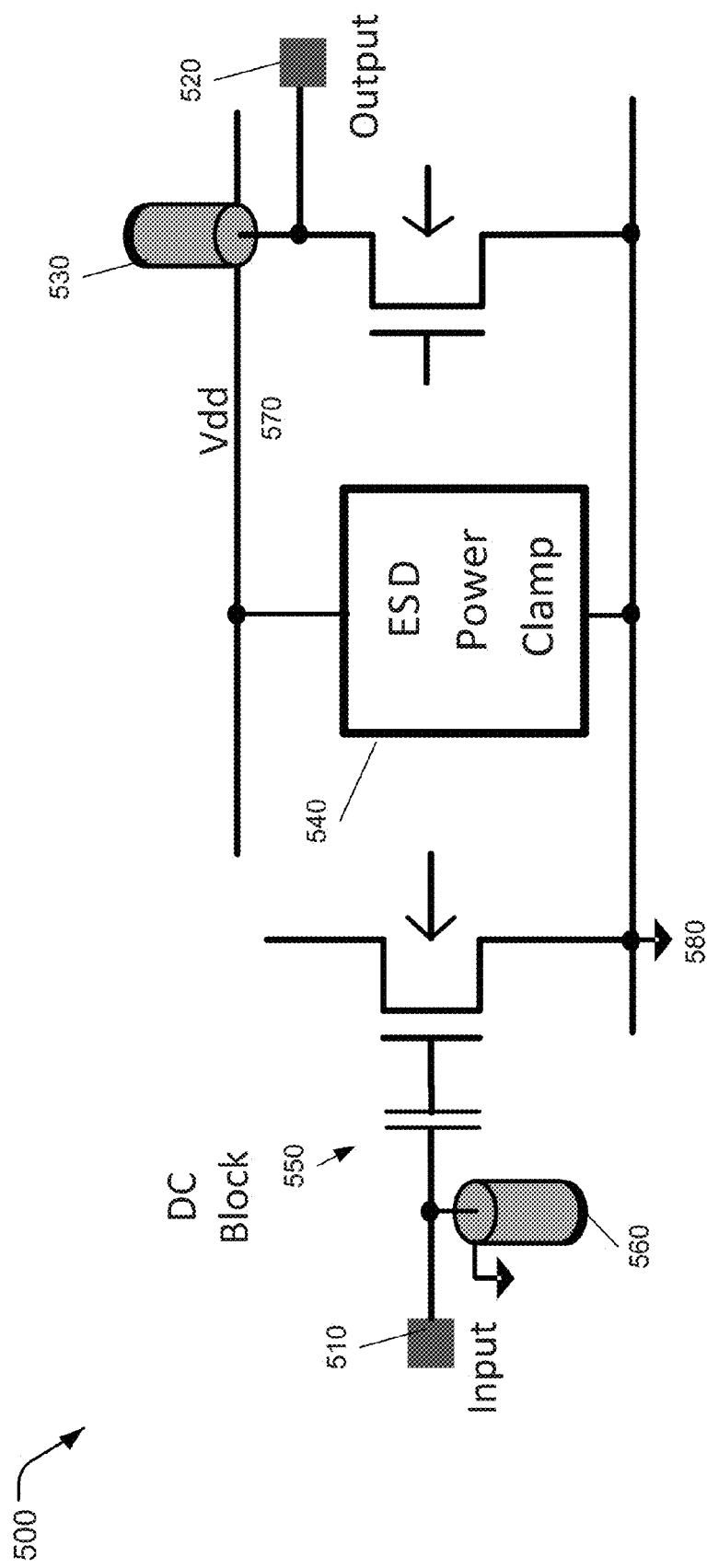
FIG. 5 is a circuit diagram to illustrate ESD protection from ESD pulses received at input and output pads of an integrated circuit.

FIG. 5 is a circuit diagram 500 to illustrate ESD protection from ESD pulses received at input and output pads of an integrated circuit. As described earlier, static electricity in the form of large voltage spikes may be transferred to any pad or contact of an integrated circuit (IC), including its input pad 510 and output pad 520. ESD protection device described with reference to FIGS. 1A, 1B, 1C, 1D, 1E, 2A, 2B, and 3 may be included in an IC to protect it from damage caused by ESD pulses received at the input pads and output pads. A TL 530 may be directly used as a drain load for an output stage since ESD current will be directed to an ESD power clamp circuit 540 coupled between the power 570 and ground 580 rails. The ESD power clamp circuit (in addition to the ESD protection device) is often included in ICs to limit the impact of a 'bounce' effect of an ESD event on the ground voltage. If the ESD protection device is used on the input side, e.g., TL 560, a DC block capacitor 550 may be added in series of the signal path to isolate the input transistor's gate bias.

Figure 6:
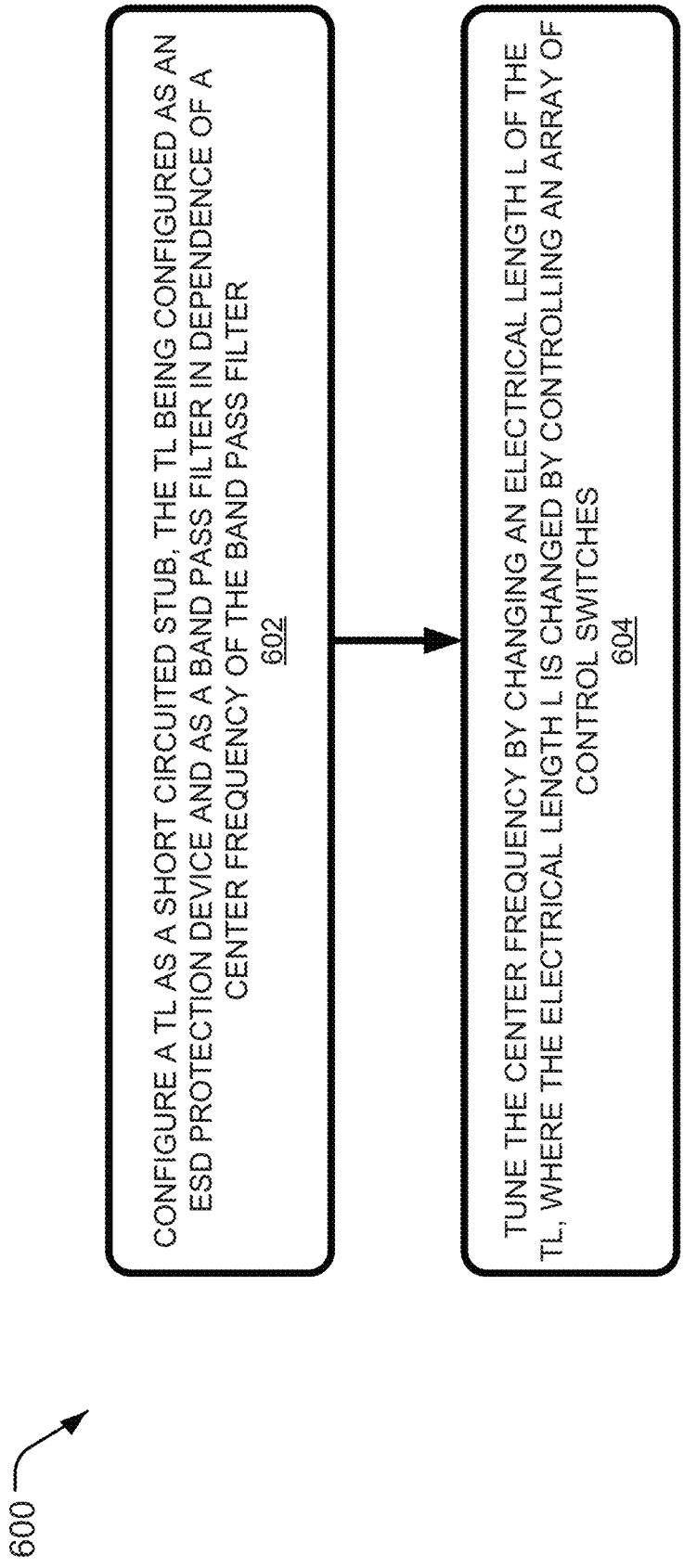
FIG. 6 is a flow diagram illustrating a process to implement techniques described herein to tune an ESD protection device.

FIG. 6 is a flow diagram illustrating a process 600 to implement techniques described herein to tune an ESD protection system. The process 600 begins at operation 602 when a TL is configured as a short circuited stub, the TL being configured as an ESD protection device and as a band pass filter in dependence of a center frequency of the band pass filter. At operation 604, the center frequency is tuned by changing an electrical length L of the TL, where the electrical length L is changed by controlling an array of control switches.

The order in which any process or method described herein is not intended to be construed as a limitation, and any number of the described process blocks can be combined in any order to implement the process, method or alternate method. For example, as a part of operation 604, the controlling of the array of control switches may include asserting the array of control switches to generate a new short circuited path having a length different than the electrical length L. Additionally, individual blocks may be deleted from the process without departing from the spirit and scope of the subject matter described herein. Furthermore, the process may be implemented in any suitable hardware, software, firmware, or a combination thereof, without departing from the scope of the invention.

The term "techniques," for instance, may refer to one or more devices, apparatuses, systems, methods, and articles of manufacture, as indicated by the context described herein. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A device comprising:
   a signal pad; and
   a transmission line (TL) coupled to the signal pad, wherein the TL is a short circuited stub having a variable electrical length L controlled by operation of an array of control switches, the TL being configured as an ESD protection device and as a band pass filter in dependence of a center frequency of the band pass filter.

2. The device of claim 1, wherein the TL is configured to pass through a signal in response to a frequency of the signal being within an allowable range of frequencies of the band pass filter, wherein the ESD protection device is configured to shunt the signal in response to the frequency being outside the allowable range.

3. The device of claim 1, wherein the TL is fabricated as coplanar waveguide on an integrated circuit chip.

4. The device of claim 2, wherein the electrical length L is configured to be exactly equal to one quarter of a wavelength of the signal, the wavelength corresponding to an operating frequency of the TL.

5. The device of claim 2,
   wherein the center frequency is tunable by controlling the electrical length L, the change in the electrical length L causing a corresponding change in the center frequency.

6. The device of claim 5, wherein the array of control switches are disposed within a configurable distance of an end of the short circuited stub.

7. The device of claim 5, wherein the array of control switches are operable to change the electrical length L to one of the electrical length L, L+ΔL, and L−ΔL.

8. The device of claim 2, wherein a pair of control switches selected from the array of control switches are asserted to generate a new short circuited path for the signal, the new short circuit path changing the electrical length L.

9. The device of claim 1, wherein the band pass filter is configured to operate in a RF band of frequencies.

10. A device comprising:
    a coplanar waveguide configured as a short circuited stub tuned to resonate at a center frequency, wherein the coplanar waveguide includes
       a top metal layer having a center signal trace equally separated from a pair of ground traces by a configurable gap, the pair of ground traces being disposed on either side of the center signal trace,
       a base metal layer to provide a shield to the coplanar waveguide,
       an end metal layer coupled to the center signal trace, the pair of ground traces and the base metal layer to provide the short circuited stub; and
    an array of control switches operable to dynamically vary an electrical length L of the coplanar waveguide, wherein a change in the electrical length L causes a corresponding change in the center frequency.

11. The device of claim 10, wherein the coplanar waveguide is configured to have a rectangular cross section.

12. The device of claim 10, wherein the coplanar waveguide is configured as an ESD protection device and as a band pass filter in dependence of the center frequency.

13. The device of claim 10, wherein the array of control switches are operable to change the electrical length to one of the electrical length L, L+ΔL, and L−ΔL.

14. The device of claim 10, wherein the configurable gap is approximately equal to 3 times a width of the center signal trace.

15. The device of claim 10, wherein the coplanar waveguide and the array of control switches are fabricated on an integrated circuit chip.

16. A device comprising:
    a signal pad;
    a transmission line (TL) coupled to the signal pad, wherein the TL is configured as an ESD protection device and as a band pass filter in dependence of a center frequency of the band pass filter; and
    an array of control switches configured to vary an electrical length of the TL, wherein a change in the electrical length causes a corresponding change in the center frequency.

17. The device of claim 16, wherein the TL is configured as a short circuited stub having the electrical length exactly equal to one quarter of a wavelength corresponding to the center frequency.

18. A method comprising:
    configuring a TL as a short circuited stub, the TL being configured as an ESD protection device and as a band pass filter in dependence of a center frequency of the band pass filter; and
    tuning the center frequency by changing an electrical length L of the TL, wherein the electrical length L is changed by controlling an array of control switches.

19. The method of claim 18, wherein the controlling comprises asserting the array of control switches to generate a new short circuited path having a length different than the electrical length L.

20. The method of claim 18, wherein TL is fabricated as coplanar waveguide on an integrated circuit chip.

* * * * *